United States Patent
Miyazaki et al.

(10) Patent No.: US 6,609,552 B2
(45) Date of Patent: Aug. 26, 2003

(54) PNEUMATIC TIRE WITH SINGLE-TWIST ORGANIC FILTER BAND CORDS

(75) Inventors: Shinichi Miyazaki, Kobe (JP); Kazumi Yamazaki, Kobe (JP); Osamu Toda, Kobe (JP)

(73) Assignee: Sumitomo Rubber Industries, Ltd., Hyogo-ken (JP)

( * ) Notice: Subject to any disclaimer, the term of this patent is extended or adjusted under 35 U.S.C. 154(b) by 0 days.

(21) Appl. No.: 09/989,394

(22) Filed: Nov. 21, 2001

(65) Prior Publication Data

US 2002/0088523 A1 Jul. 11, 2002

(30) Foreign Application Priority Data

Nov. 22, 2000 (JP) ........................................ 2000-355993

(51) Int. Cl.$^7$ .............................. B60C 9/20; B60C 9/22
(52) U.S. Cl. ...................... 152/527; 152/531; 152/533
(58) Field of Search ................................. 152/531, 533, 152/527

(56) References Cited

U.S. PATENT DOCUMENTS

| | | | |
|---|---|---|---|
| 3,757,843 A | 9/1973 | Carr | |
| 4,284,117 A | 8/1981 | Poque et al. | |
| 4,458,475 A | 7/1984 | Schmit et al. | |
| 4,724,881 A | * | 2/1988 | Poque et al. ............ 152/531 X |
| 5,849,121 A | * | 12/1998 | Reuter .................... 152/533 X |

* cited by examiner

Primary Examiner—Adrienne C. Johnstone
(74) Attorney, Agent, or Firm—Birch,Stewart,Kolasch & Birch, LLP

(57) ABSTRACT

A pneumatic tire comprises a breaker disposed radially outside the carcass crown and a band disposed radially outside the breaker and made of one or more cords laid at an angle of not more than 5 degrees with respect to the tire circumferential direction; the band cords are an organic fiber cord which has a single-twist structure, a cord thickness D of from 500 to 3200 dtex, a twist coefficient T of from 150 to 750 which is defined by the product of the square root of the cord thickness D and the twist number N (turn) per 10 cm length of the cord, and an elongation of from 4.0 to 8.0% under a tension of 2.7 g/dtex; the band cord count per 1 cm width of the band is in a range of from 5 to 25; and when the tire is not inflated and loaded with no tire load, a tensile force Ls of a band cord in the tire is in a range of from 4 to 25 N, and the total of the tensile forces LS of the band cords per 1 cm width of the band is in a range of from 50 to 250 N.

9 Claims, 1 Drawing Sheet

PNEUMATIC TIRE WITH SINGLE-TWIST ORGANIC FILTER BAND CORDS

BACKGROUND OF THE INVENTION

The present invention relates to a pneumatic tire, more particularly to an improved belt structure for reinforcing the tread portion.

In the radial tires provided with a tread reinforcing breaker, which are designed for high speed running in particular, so called edge protectors or edge bands are usually provided on the radially outside of the breaker edges to prevent the breaker edges from being risen by a centrifugal force during high speed running.

The reinforcing cords which are widely used in such a band structure, are organic fiber cords having a conventional double-twist structure in which a cord is formed by twisting several strands together (last twist), each strand formed by twisting organic fibers together (primary twist) in the opposite direction to the last twist.

In a double-twist structure, an apparent diameter of an organic fiber cord becomes relatively large in comparison with the under mentioned a single-twist structure. Accordingly, even if the cords used are the same weight, a band made of double-twist structure cords becomes heavier than a band made of single-twist structure cords because the topping rubber is increased in the thickness and the total weight.

On the other hand, during making the tire, in other words, when the tire is not vulcanized and thus the cords are not yet heat set, the double-twist structure cords show a relatively large elongation at a relatively light load. An unvulcanized tire is subjected to a high inflation pressure during vulcanization and thus the band cords therein are stretched, and they are set after the vulcanization. The tension and stretch of the band cords which depend on the twist structure can be controlled by adjusting the winding diameter, winding tension, vulcanizing conditions and the like, but it requires skill and trials which are not cost effective.

BRIEF SUMMARY OF THE INVENTION

It is therefore, an object of the present invention to provide a pneumatic tire in which, by employing band cords having a single-twist structure in which the twist coefficient, elongation %, residual tension, and cord count are arranged in a well-balanced manner, the band can display its maximum constricting force by minimal band cords and thereby a tire weight reduction and a cost reduction are possible without deteriorating the high speed durability, high speed steering stability and the like.

According to the present invention, a pneumatic tire comprises a carcass extending between bead portions through a tread portion and sidewall portions, a breaker disposed radially outside the carcass in the tread portion, and a band disposed radially outside the breaker and made of one or more cords laid at an angle of not more than 5 degrees with respect to the tire circumferential direction, the above-mentioned one or more cords each being an organic fiber cord having a single-twist structure, a cord thickness D of from 500 to 3200 dtex, a twist coefficient T of from 150 to 750 which is defined by the product of the square root of the cord thickness D and the twist number N per 10 cm length of the cord, and an elongation under a tension of 2.7 g/dtex of from 4.0 to 8.0%, a cord count of the above-mentioned one or more cords per a unit width of 1 cm of the band being in a range of from 5 to 25, in a state of the tire which is not inflated and loaded with no tire load, a tensile force Ls of the band cord in the tire being in a range of from 4 to 25 N, and a band constricting index LI being in a range of from 50 to 250 N, the band constricting index LI defined as the total of the tensile forces Ls of said one or more cords per a unit width of 1 cm of the band.

BRIEF DESCRIPTION OF THE DRAWING

An embodiment of the present invention will now be described in detail in conjunction with the accompanying drawings.

DETAILED DESCRIPTION OF THE INVENTION

Figure 1:
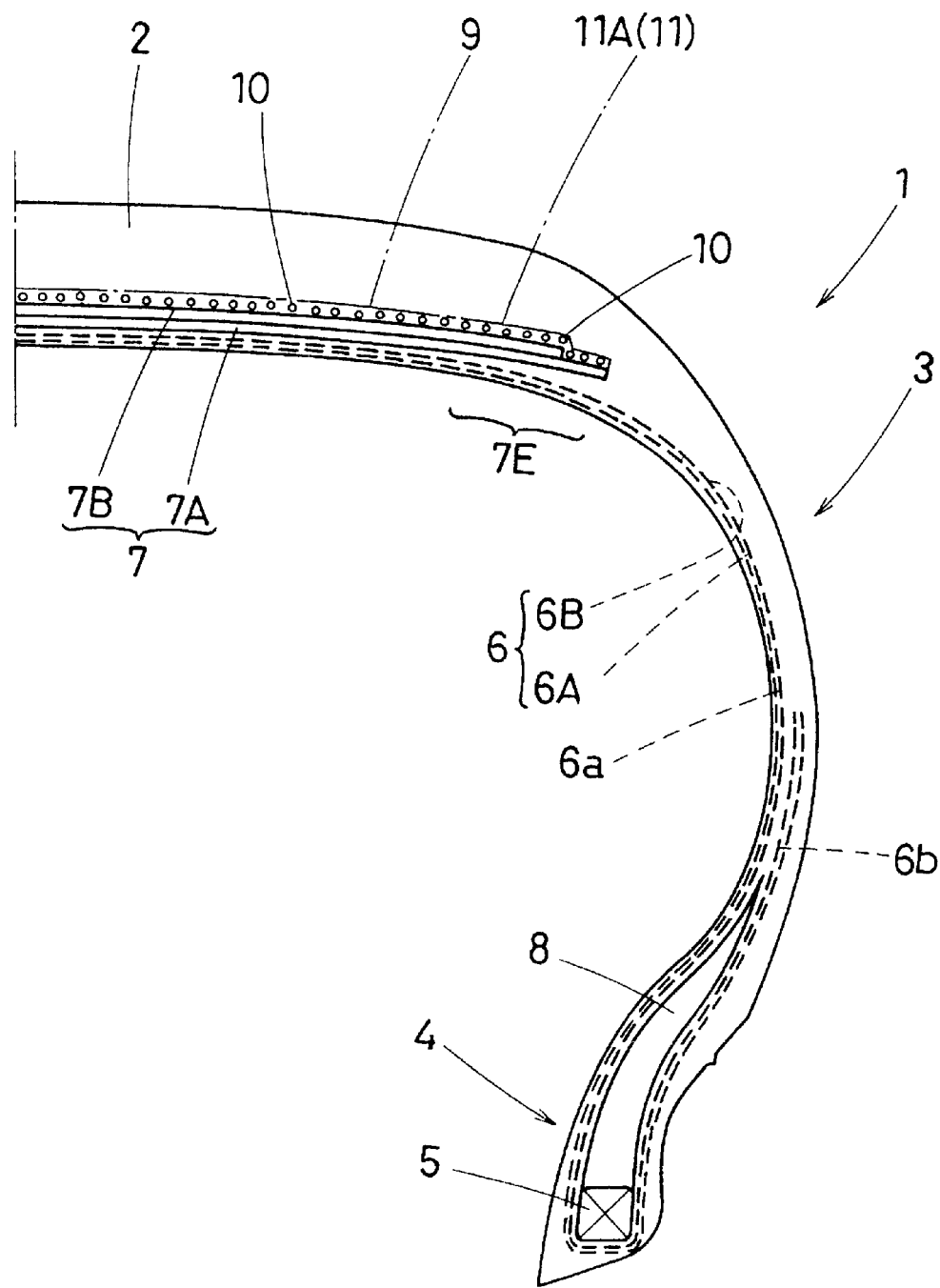
FIG. 1 is a cross sectional view of a pneumatic tire according to the present invention.

In FIG. 1, tire 1 according to the invention comprises a tread portion 2, a pair of sidewall portions 3, a pair of bead portions 4 each with a bead core 5 therein, a carcass 6 extending between the bead portions 4, a breaker 7 disposed radially outside the carcass 6 in the tread portion 2, and a band 9 disposed radially outside the breaker 7.

The tire 1 in this embodiment is a radial tire for passenger cars.

The carcass 6 is composed of at least one ply of cords arranged radially at an angle of from 75 to 90 degrees with respect to the circumferential direction, extending between the bead portions 4 through the tread portion 2 and sidewall portions 3 and being turned up around the bead core 5 in each bead portion 4 to form a pair of turnups 6b and a main 6a therebetween. For the carcass cords, organic fiber cords, e.g. polyester, rayon, nylon, aromatic polyamide and the like may be used in case of passenger car tires, usually polyester fiber cords are used. But, steel cords may be also usable. In this example, the carcass 6 consists of two plies 6A and 6B of polyester fiber cords.

Between the carcass main 6a and turnup 6b in each bead portion 4, there is disposed a bead apex rubber 8 extending radially outwards from the bead core 5 while tapering towards its radially outer end.

The breaker 7 is composed of at least two cross plies 7A and 7B of high elastic modulus cords laid obliquely at an angle of from 10 to 35 degrees with respect to the circumferential direction of the tire. The breaker 7 extends over the substantially overall width of the tread portion 2. For the breaker cords, steel cords, especially monofilament steel cords, high elastic modulus organic fiber cords, e.g. aromatic polyamide fiber cord, aromatic polyester fiber cord and the like may be used. In this example, the breaker 7 is composed of two cross plies 7A and 7B of monofilament steel cords.

The band 9 is composed of at least one ply 11 of one or more cords 10 laid at an angle of not more than 5 degrees, usually almost zero degrees with respect to the tire circumferential direction. The band 9 covers at least the axial edges 7E of the breaker 7 so as to prevent their rising due to a centrifugal force during high speed running in order to improve the high-speed durability. Thus, the band 9 may be compose of a full-width band ply extending across the overall width of the breaker, or a pair of axially spaced edge band plies each covering one of the edges 7E at least, or a combination of a full-width band ply and edge band plies. In this example, the band 9 is compose of a full-width band ply 11A only.

The band ply 11 is preferably made of spiral windings of one or more cords 10. In winding the band cord(s) 10, it is preferable that a rubber tape (made of unvulcanized topping rubber) of 2 to 10 cm width in which one or more cords 10 are embedded along the length thereof, is spirally wound. Further, it may be also possible to wind a strip of rubberized parallel cords 10 which has a width corresponding to the ply width.

Here, the band cord 10 is an organic fiber cord having a single-twist structure in which organic fibers gathered in a bunch are twisted once into a cord. The thickness D of the cord 10 is set in a range of from 500 to 3200 dtex, preferably 1000 to 2500 dtex. The twist coefficient T which is defined as the product of the square root of the above-mentioned thickness D and the twist number N (turns) per 10 cm length of the cord is set in a range of from 150 to 750, preferably 200 to 600. The elongation % of the cord under a load of 2.7 g/dtex is set in a range of from 4.0 to 8.0%, preferably from 4.5 to 7.0%.

The elongation % is measured according to the Japanese Industrial Standard L1017—"Testing Methods for Chemical Fiber Tire Cords", Section 7.7 "Elongation Percentage in Constant Load", 7.7.1 "Test in Standard Condition".

Further, a band constricting index LI is set in a range of 50 to 250 N, preferably 55 to 200. The band constricting index LI is the total tensile force (N) of the band cords 10 per a unit width of 1 cm of the band 9 when the tire is not inflated and not loaded. Thus, the band constricting index LI may be obtained by multiplying the above-mentioned cord count M/1 cm and the tensile force Ls of a band cord 10 in the tire under the above-mentioned condition if the tensile forces are substantially constant through the unit width. In the narrow unit width of 1 cm, it may be possible to regard the tensile forces as substantially constant. Further, the tensile force Ls may be regarded as being almost independent of whether the tire is mounted on a wheel rim or not. Thus, the tensile force Ls can be obtained as follows. First, the tread rubber is partially removed from the tire being in its natural state so as to become possible to specify some cords 10 to be measured and then the length La of the cord 10 being left in the tire is measured. It is preferable for accuracy that the length La is about one meters and the measurement is made at least three different positions. After the length La is measured, the band cord 10 of the length La is took out from the tire as a tape-like specimen of about 10 mm width together with the surrounding rubber and adjacent cords. And the cord 10 is separated therefrom and the length Lb of the resultant shrunk cord 10 is measured. Using a tensile tester, the elongation of the band cord 10 is measured while varying the tensile force to obtain a load-elongation curve, and from the curve, the tensile force Ls under a stress corresponding to the elongation from the length Lb to the length La is obtained. The above measurements should be made under a constant condition, in the present invention, made at a temperature of 20 deg. C. and a humidity of 67%.

For the band cords 10, in addition to relatively low tensile modulus organic fiber cord, e.g. nylon, polyester, rayon and the like, high elastic modulus organic fiber cords, such as polyethylene naphthalate (PEN), polyethylene terephthalate (PET), aromatic polyamide and rthe like may be used. In this example, a nylon fiber cord is used.

In comparison with a double-twist structure, a single-twist structure can decrease the apparent cord diameter. As a result, the thickness of the band can be decreased to decrease the weight. As the cord twist coefficient T is decreased to the above-mentioned range, the cord strength and the tensile elastic modulus are improved, and the constricting force to the breaker 7 increases.

If the cord twist coefficient T is more than 750, it becomes difficult to improve the constricting force, high-speed durability and high speed steering stability. If the cord twist coefficient T is less than 150, the cord strength tends to decrease to deteriorate the durability.

If the cord thickness D is more than 3200 dtex, not only the band weight but also the heat generation from the cords increase. If the cord thickness D is less than 500 dtex, even if the cord count is decreased, it becomes difficult for the band to provide a sufficient constricting force.

If the elongation % is less than 4.0%, the band can not follow the deformation of the tire. If the elongation % is more than 8.0%, it is difficult to improve the high-speed durability and high speed steering stability.

As the band constricting index LI is set in the above-mentioned range, a noise around a relatively low frequency of 200 Hz can be improved. If the index LI is less than 50, it is difficult to improve the noise. If the index LI is more than 250, the tire uniformity is liable to deteriorate, and further a noise heard on the outside of the car such as pass-by noise deteriorates. By using monofilament steel cords as the breaker cords, the noise performance may be further improved.

Comparison Tests

Test tires of size 195/65R15 (Rim size 6JX15) for passenger cars having the same structure shown in FIG. 1 except for the band were made and tested for noise, steering stability, and high-speed durability.

The carcass was composed of two plies of 1100dtex/2 polyester cords (cord angles: +88 and −88 degrees). The breaker was composed of two cross plies of 1X1X0.42 steel cords (cord angle: +20 and −20 degrees). The band was composed of a full-width band ply formed by spirally winding a tape of 5 cm width. The rest are given in Table 1.

Tire weight: The tire weights are indicated as a difference from Ref. 1.

Noise test: During running a 2000 cc passenger car provided on all the four wheels with test tires on a smooth asphalt road in a tire test course at a speed of 80 km/h, the sound level at a frequency of 200 Hz was measured near the driver's left ear.

High-speed durability Test: The test was made as follows. The test tire mounted on a 6JX15 wheel rim and inflated to 280 kPa was run on a drum tire tester under a tire load of 80% of 492 kgf, while keeping the temperature around the tire between 20 and 30 deg. C. From the initial speed of 170 km/hr to 200 km/hr, the running speed was increased every 10 minutes at steps of 10 km/h and after reached to 200 km/h, the speed was increased every 20 minutes at steps of 10 km/h, and the running distance to any failure was added up. The results are indicated by an index based on Ref. 1 being 100, wherein the larger the index number, the better the high-speed durability.

High speed steering stability test: During running the test car on a dry asphalt road in the test course, the driver evaluated the high speed steering stability from steering response, rigidity and road grip. The results are indicated by an index based on Ref. 1 being 100, wherein the larger the index number, the better the stability.

The test results are shown in the following Table 1.

TABLE 1

| Tire | Ref.1 | Ref.2 | Ex.1 | Ex.2 |
|---|---|---|---|---|
| Band cord | | | | |
| Material | nylon 66 | nylon 66 | nylon 66 | nylon 66 |
| Structure(thickness) | 940 dtex/2 | 1420 dtex/2 | 1400 dtex/1 | 2100 dtex/1 |
| Apparent diameter (mm) | 0.51 | 0.61 | 0.32 | 0.36 |
| Twist number N turn/10 cm | 47 | 36 | 20 | 16 |
| Twist coefficient T | 2087 | 1918 | 748 | 733 |
| Weight (g/m) | 0.215 | 0.255 | 0.128 | 0.192 |
| Elongation at 2.7 g/dtex | 12.30% | 8.50% | 6.10% | 6.50% |
| Tension Ls (N) | 4.1 | 4.6 | 5.6 | 6.7 |
| Cord count M/1 cm | 9.8 | 9.8 | 9.8 | 9.8 |
| Band constricting index LI | 40 | 45 | 60 | 71 |
| Tire weight | 0 | +30 g | −60 g | −20 g |
| Test Results | | | | |
| Noise (dB) | 63 | 62.8 | 62.5 | 62.1 |
| Steering stability | 100 | 101 | 103 | 104 |
| High-speed durability | 100 | 101 | 105 | 106 |

It was confirmed from the test results that the tires according to the present invention can be improved in the high-speed durability, high speed steering stability and noise performance although the weight and cost are reduced.

What is claimed is:

1. A pneumatic tire comprising
    a carcass extending between bead portions through a tread portion and sidewall portions,
    a breaker disposed radially outside of the carcass in the tread portion, and
    a band disposed radially outside the breaker and made of one or more cords laid at an angle of not more than 5 degrees with respect to the tire circumferential direction,
    said one or more cords each being an organic fiber cord having
        a single-twist structure,
        a cord thickness D of from 500 to 3200 dtex,
        a twist coefficient T of from 150 to 750 which is defined by the product of the square root of the cord thickness D and the twist number N (turn) per 10 cm length of the cord, and
        an elongation of from 4.0 to 8.0% under a tension of 2.7 g/dtex,
    a cord count M of said one or more cords per a unit width of 1 cm of the band being in a range of from 5 to 25,
    in a state of the tire which is not inflated and loaded with no tire load, a tensile force Ls of the band cord in the tire being in a range of from 4 to 25 N, and a band constricting index LI being in a range of from 50 to 250 N, the band constricting index LI defined as the total of the tensile forces Ls of said one or more cords per a unit width of 1 cm of the band.

2. A pneumatic tire according to claim 1, wherein the breaker is composed of two cross plies of steel cords.

3. A pneumatic tire according to claim 1, wherein the breaker is made of monofilament steel cords.

4. A pneumatic tire according to claim 1, wherein the carcass is composed of two plies of organic fiber cords.

5. A pneumatic tire according to claim 1, wherein the carcass is made of polyester fiber cords.

6. A pneumatic tire according to claim 1, wherein the band is composed of a full-width band ply extending across the overall width of the breaker and made of windings of the band cords.

7. A pneumatic tire according to claim 1, wherein said cord thickness D is in a range of from 1000 to 2500 dtex.

8. A pneumatic tire according to claim 1, wherein said twist coefficient is in a range of from 200 to 600.

9. A pneumatic tire according to claim 1, wherein said elongation is in a range of from 4.5 to 7.0%.

* * * * *